Figure 1:
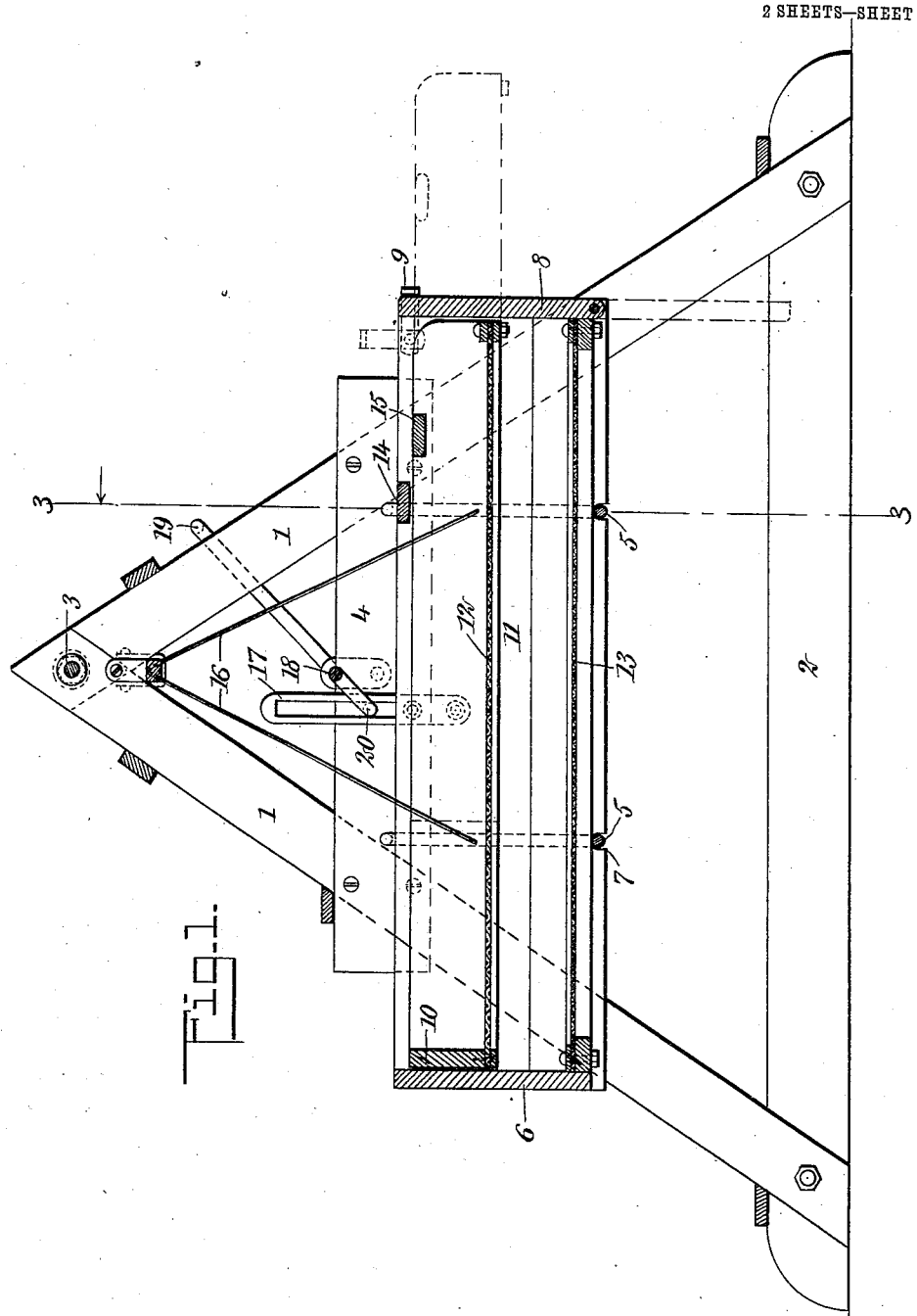

J. T. COX.
COTTON SEED SEPARATOR.
APPLICATION FILED JUNE 25, 1908.

914,800.

Patented Mar. 9, 1909.
2 SHEETS—SHEET 1.

WITNESSES
L. Almquist
E. B. Marshall

INVENTOR
Joseph T. Cox
BY Munn & Co.
ATTORNEYS

J. T. COX.
COTTON SEED SEPARATOR.
APPLICATION FILED JUNE 25, 1908.
914,800.
Patented Mar. 9, 1909.
2 SHEETS—SHEET 2.
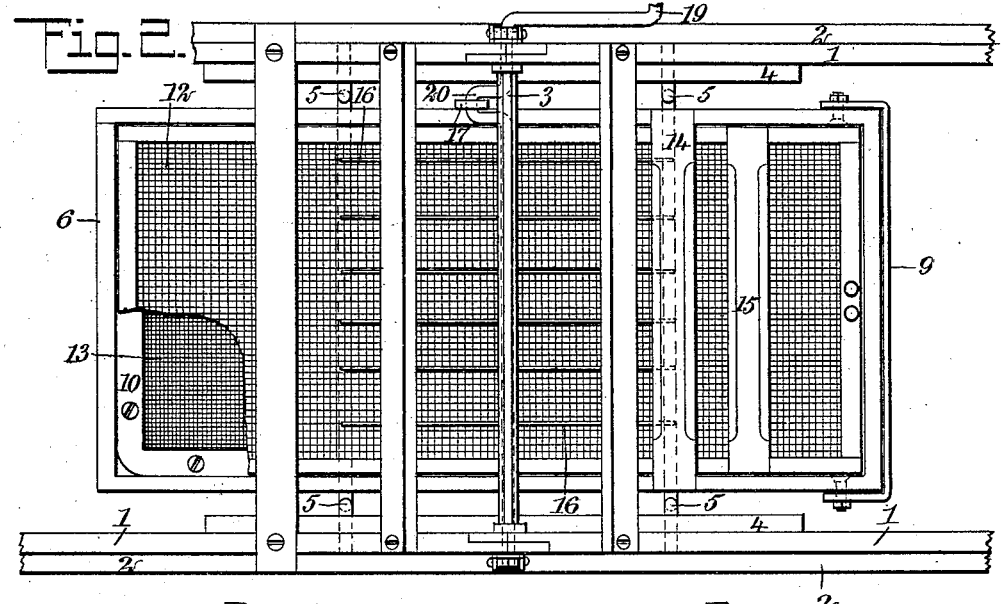
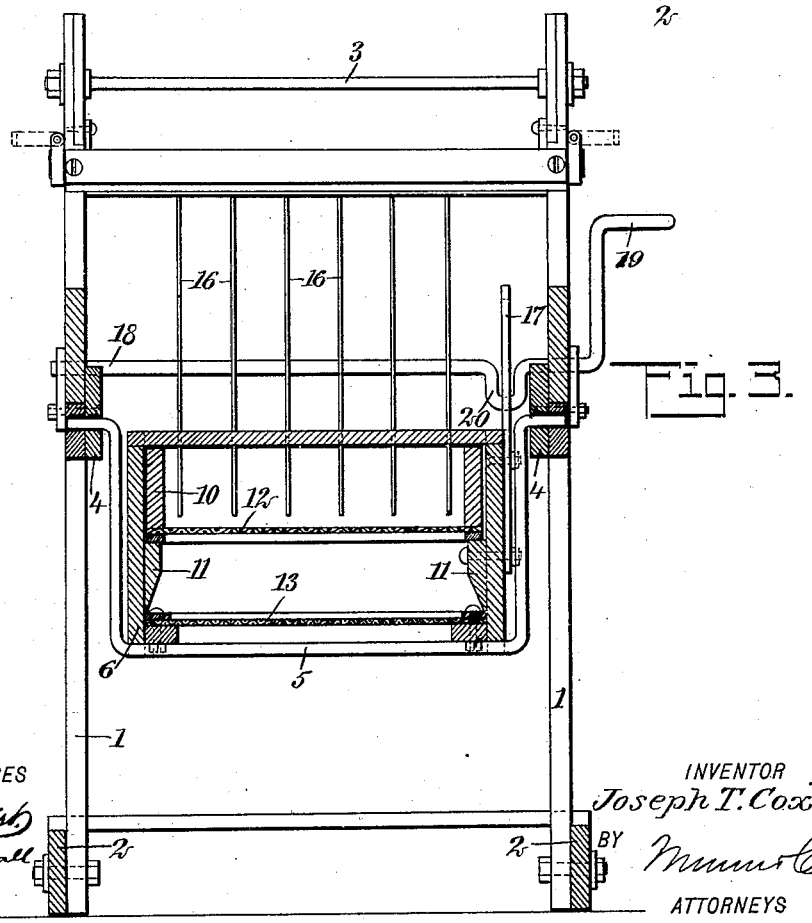
WITNESSES
INVENTOR
Joseph T. Cox
BY
ATTORNEYS

UNITED STATES PATENT OFFICE.

JOSEPH T. COX, OF MONTICELLO, GEORGIA, ASSIGNOR OF ONE-THIRD TO WILLIAM S. COX, OF CULVERTON, GEORGIA, AND ONE-THIRD TO JAMES J. COX, OF MACON, GEORGIA.

COTTON-SEED SEPARATOR.

No. 914,800.      Specification of Letters Patent.      Patented March 9, 1909.

Application filed June 25, 1908. Serial No. 440,271.

*To all whom it may concern:*

Be it known that I, JOSEPH T. COX, a citizen of the United States, and a resident of Monticello, in the county of Jasper and State of Georgia, have invented a new and Improved Cotton-Seed Separator, of which the following is a full, clear, and exact description.

My invention relates to cotton seed separators, and has for its object to provide a separator which will more effectively separate the large and select cotton seed from the small, faulty and undeveloped seed which should not be planted, as healthy plants cannot be grown from such poor seed and when it is intermingled with good seed, the poor seed usually germinates first and impairs the development of the good plants.

Cotton seed is inclined to pack together, and in the construction of a cotton seed separator this fact must be kept in mind, for otherwise it will be found that while a device may be theoretically perfect, it will not serve to perform the special function necessary for a cotton seed separator.

My invention consists of a frame in which a box is mounted to swing, there being a screen in the bottom of the box and one of its ends being hinged so that the sieve contained therein may be readily removed. Agitators which are downwardly disposed are adapted to keep the seed in the sieve stirred up, and the means for hanging the box in the frame assures the horizontal position of the box at all times. To the box is secured a slotted arm and in this slot a crank is adapted to move, this crank serving to swing the box horizontally, which in connection with the agitators keeps the seed stirred up, to permit the poor and faulty seed to pass through the sieve into the box below, and as the mesh of the screen in the box is smaller than the mesh of the sieve, a second selection of seed is obtained, only the absolutely worthless seed passing through the sieve in the box, to be used for fertilizing or other purposes.

In this specification I will describe the preferred form of my invention, but it will be understood that I do not limit myself thereto, as I consider myself entitled to all forms and embodiments of the invention which may be held to fall within the scope of the appended claim.

Reference is to be had to the accompanying drawings, forming a part of this specification, in which similar characters of reference indicate corresponding parts in all the figures, in which—

Figure 1 is a side sectional view of the invention; Fig. 2 is a plan view of the same; and Fig. 3 is a sectional view on the line 3—3 of Fig. 1.

By referring to the drawings, it will be seen that I provide obliquely disposed frame members 1 which are secured to base members 2 and which are united at their upper terminals by a bolt 3. Upon the obliquely disposed frame members 1 are disposed longitudinally disposed frame members 4, in which are journaled the U-shaped hangers 5, on which a box 6 is hung. This box 6 has grooves 7 in which the hangers 5 fit. The hangers 5 are journaled, as stated, in the longitudinally disposed frame members 4, and are similar in all respects, and are journaled at the same height so that the box 6 will be disposed horizontally while swinging. One end 8, of the box, is hinged so that it is adapted to be opened and it is held in a closed position by a member 9, which is hinged to the sides of the box and is adapted to fit over the top of the end 8 to hold it in place. A sieve 10 is constructed to fit in the box, and this sieve 10 when in the box rests on supporting members 11, which are disposed longitudinally on the interior of the box. The bottom of the sieve 10 has a screen 12 and the bottom of the box 6 has a screen 13, the screen 12 being of a larger mesh than the screen 13. A transverse member 14 is secured to the top of the box and a transverse member 15 is secured to the top of the sieve, these transverse members 14 and 15 being so disposed that they may be used to swing the box and also to draw the sieve 10 from the box 6, see dotted lines in Fig. 1, after the end 8 has been swung downwardly to expose the end of the sieve. Agitators 16 are secured to the obliquely disposed members 1, and are hung downwardly into the sieve 10 so that they will agitate the cotton seed in the said sieve when the box 6 is swung horizontally, as stated above. The means which I have provided for swinging the box consists of a slotted arm 17, which is secured to the box and is disposed upwardly, a shaft 18, having a crank handle 19, being journaled in the longitudinally disposed members 4, this shaft 18 having a crank 20, the crank being disposed in the slot in the arm 17.

In using my invention, cotton seed is placed in the sieve 10, and with the agitators 16 in position the shaft 18 is rotated by means of the handle 19 or by any other known means, by which means the crank 20 is adapted to move in the slot in the arm 17, and as this arm 17 is secured to the box 6 the box is moved horizontally backward and forward relatively to the shaft 18, and the cotton seed in the sieve will therefore be agitated, and the small and faulty seed will fall through the screen 12 in the sieve on to the screen 13 in the box 6. This screen 13 in the box 6 will retain all but the worthless seed, so that it will be seen that two selections of seed are made by my device, that retained by the sieve being seed of the larger quality and that which is retained by the box 6 being of a poorer grade, but still of some value. During the operation of the separator, the box 6 and the sieve 10 are always in a horizontal position to prevent the packing of the seed, for as stated above, it is always necessary to prevent the seed from in any way becoming packed during its separation.

Having thus described my invention, I claim as new and desire to secure by Letters Patent:

In a cotton seed separator, a frame, a box mounted to swing in the frame, a screen in the bottom of the box, a sieve which is disposed in the box, one of the ends of the box being hinged to the box body, a rod adapted to hold the hinged end in position, the rod having bent terminals which are pivoted to the box, a slotted arm secured to the box, a shaft journaled in the frame, a crank on the shaft which is disposed in the slot, and agitators secured to the frame which have terminals disposed in the sieve.

In testimony whereof I have signed my name to this specification in the presence of two subscribing witnesses.

JOSEPH ✕ T. COX.
mark

Witnesses:
W. A. FLORENCE,
G. M. DAVIS.